UNITED STATES PATENT OFFICE.

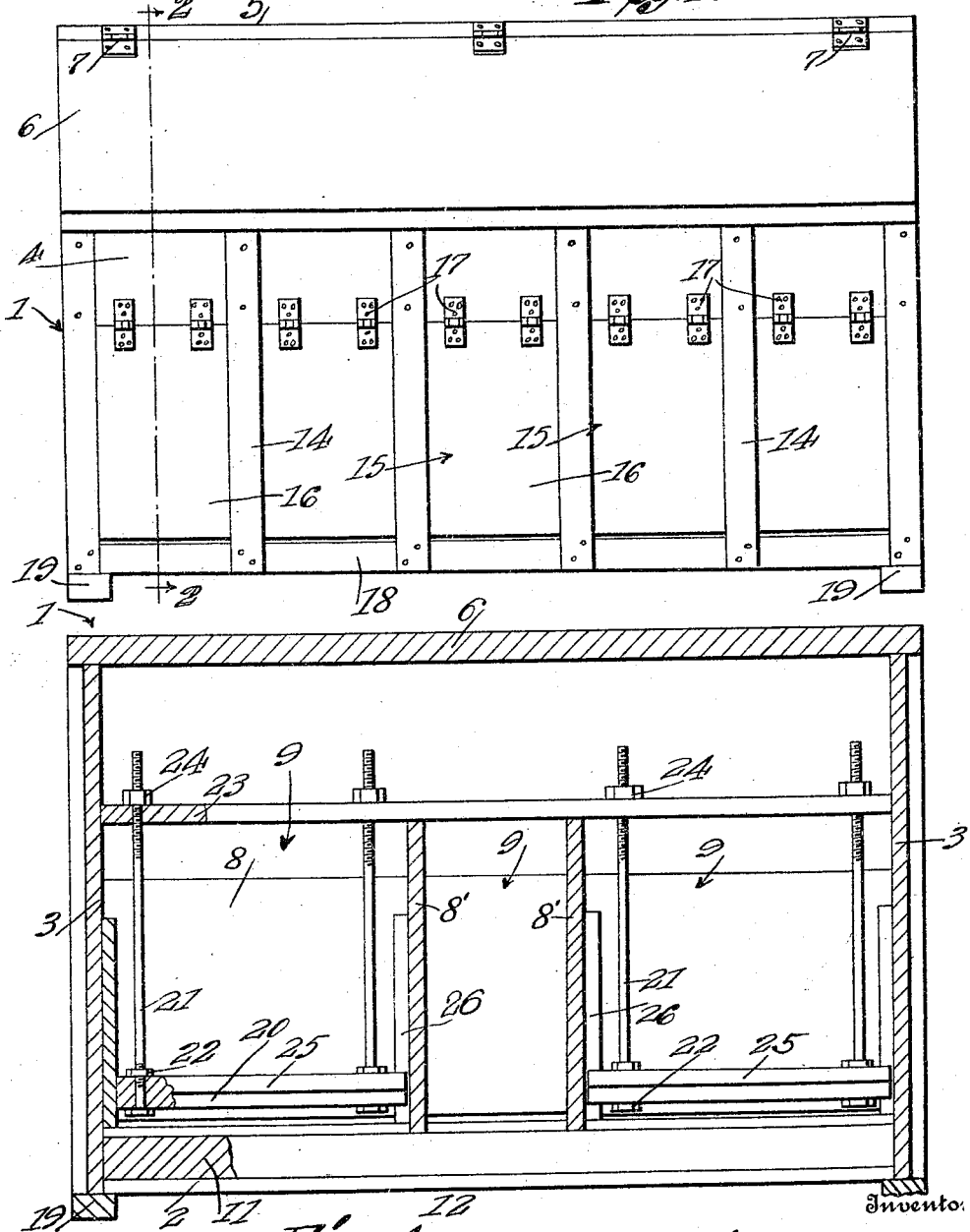

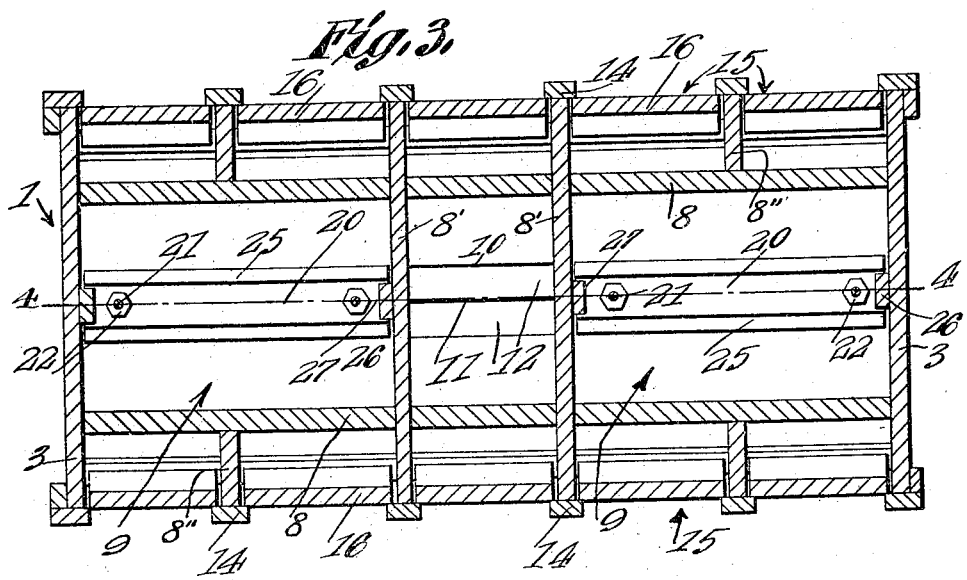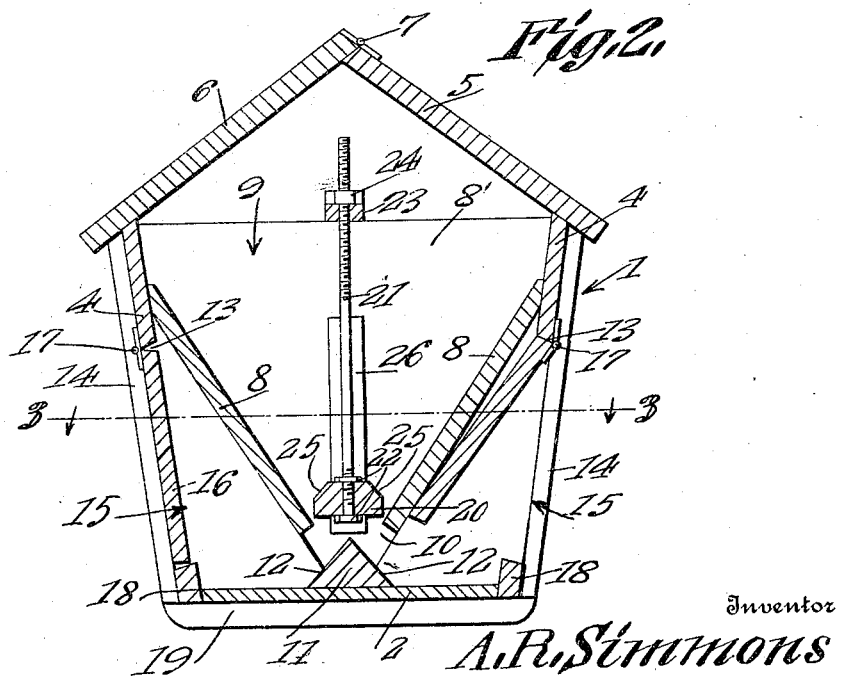

ALLEN R. SIMMONS, OF STANBERRY, MISSOURI.

STOCK-FEEDER.

1,297,743.      Specification of Letters Patent.      Patented Mar. 18, 1919.

Application filed April 27, 1917. Serial No. 165,019.

*To all whom it may concern:*

Be it known that I, ALLEN R. SIMMONS, a citizen of the United States, residing at Stanberry, in the county of Gentry and State of Missouri, have invented a new and useful Stock-Feeder, of which the following is a specification.

The present invention appertains to stock or animal feeders, and aims to provide a novel and improved structure of that character, from which the feed may be readily partaken of by the animals, and which is so constructed as to prevent the feed being injured by the elements, since the device excludes rain, sunlight, and winds from the feed, as well as being rodent proof.

It is the object of the invention to provide a stock feeder having feed troughs and openings, with a bin for supplying the feed to the troughs and means for closing said openings and adapted to be pushed open inwardly by the animals so that they can have access to the troughs, the assemblage of the component elements being such as to advantageously carry out the desired results.

A further object of the invention is the provision of novel means in a device of the character indicated for controlling or regulating the flow of feed from the bins to the feed troughs.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a side elevation of the improved feeder.

Fig. 2 is a cross section on the line 2—2 of Fig. 1.

Fig. 3 is a horizontal section on the line 3—3 of Fig. 2.

Fig. 4 is a longitudinal section on the line 4—4 of Fig. 3.

The casing 1 of the feeder may be constructed in various sizes and proportions, according to the circumstances and is preferably composed of wood. Said casing comprises a bottom 2, vertical ends 3, inclined sides 4, and a gable top 5. One side or section of the top is loose to provide a door 6, which is hinged, as at 7, to the upper edge of the other side of the top, at the ridge thereof.

In order to provide a plurality of bins within the casing, one or more transverse partitions 8' are provided therein between its sides. Inclined supplementary walls or chutes 8 are disposed longitudinally within the casing between the ends and partitions 8', and are secured to said ends of the casing and partitions 8', while their upper edges are secured to the upper longitudinal strips of the sides 4. The walls 8 diverge upwardly and have their lower edges spaced slightly above the bottom 2 of the casing and arranged relatively close together, and said walls 8 with the partitions 8' provide the feed bins or hoppers 9 therebetween, which are closed by the gable top or roof 5. The door 6, when opened, enables the feed, salt, or other material to be readily dumped into the respective bins. A discharge slot or throat 10 is provided between the lower edges of the walls 8 through which the feed may gravitate from the bins onto the bottom 2.

A longitudinal division bar 11 is secured upon the bottom or floor 2 between the ends of the casing, and is disposed below the slot or slots 10, said bar having the oppositely inclined sides 12 underneath the lower edges of the walls 8 for deflecting the feed toward the opposite sides under the walls 8.

The sides 4 of the casing are open between the ends and upper and lower strips thereof, as at 13, and upright bars or jambs 14 are secured at their upper and lower ends to said strips of the casing upon the exterior thereof, and are inclined similar to said sides. These bars 14 are spaced suitably apart to provide openings 15 therebetween, which are normally closed by hinged doors or panels 16 having their upper ends hinged, as at 17, to the upper strips of the sides 4 at the upper ends of said openings 15. The doors 17 are wider than the openings 15 and the edges of the doors normally rest outwardly against the bars or stops 14 upon the inner sides thereof, to limit the outward movement of said doors. The doors normally swing downwardly to closed position by their own weight, and thereby close the openings. When the doors 16 are pushed inwardly, they swing readily away from the lower ends of the openings 15 against the walls 8 which serve as stops to limit the inward movement of the doors.

The feed troughs are provided upon the bottom or floor 2 of the casing with the upwardly projecting boards or strips 18 below the openings 15 constituting the lower portions of the sides 4. The doors 16 normally swing snugly above the boards 18 to prevent the elements, rodents, or the like, from entering the casing and troughs.

The bottom 2 of the casing may be secured upon suitable runners or sills 19 for conveniently supporting the casing, and allowing the casing to be dragged from one place to another if desired.

As a means for regulating the flow of feed, salt, or other material, there is provided within each of the desired bins 9, a longitudinal elongated valve or regulating bar 20. This valve 20 is adjustably suspended within the bin between the walls 8 near their lower edges by means of suspension rods or hangers 21 extending through the valve 20 near the ends thereof, and having nuts 22 threaded thereon for clamping said valve. The rods 21 extend upwardly through a longitudinal supporting bar 23 extending from one end of the casing to the other over and resting upon the upper edges of the partitions 8'. In this connection, it will be noted that said partitions 8' have their edges secured to the bars or stops 14 between the doors 16, as seen in Fig. 3. Nuts 24 are threaded upon the upper terminals of the rods 21 and seat upon the supporting bar 23, whereby when the nuts 24 are rotated, the rods 21 can be raised or lowered for correspondingly adjusting the valve 20, whereby to increase or decrease the width of the slots between the edge portions of the valve 20 and the walls 8, to control the flow of feed. The edges of the valve 20 are beveled, as at 25, and the beveled surfaces are normally uppermost whereby to direct the feed toward the slots, although the valve can be inverted by removing the nuts 22, in order that the beveled surfaces will be substantially parallel with the walls 8, when this is desired. Vertical guide cleats 26 are secured to the partitions 8' and ends of the casing, and the valves 20 have notches 27 in their ends for the engagement of the cleats 26 whereby to guide the valves for vertical adjustment. By opening the door 6, the nuts 24 are accessible for adjusting the valves. It will be noted that the material which passes one edge of the valve down one wall or chute 8 will drop onto one side of the division bar 11, while the material passing the other edge of the valve will drop on the other side of the division bar, so that the streams of material are deflected toward opposite sides into the respective feed troughs.

In use, the animals can readily swing the doors 16 open by butting thereagainst, and can then readily partake of the feed in the troughs. As soon as the animals leave the troughs, the doors 16 swing shut by gravity to exclude rain, sunlight, winds, rodents, and the like. Should the feed bank up behind the lower ends of the doors 16, due to any cause whatever, the doors when swung open will force the feed backwardly from the openings 15 and thus avoid spilling. The present feeder is sanitary in use, and enables the animals to help themselves to the feed whenever they desire, the animals quickly becoming accustomed to the operation of the feeder by swinging the doors 16 inwardly. The feeder can be constructed in various sizes, according to the character of stock or animals to be supplied with feed, and the feeder can have various numbers of feeding openings and doors.

There are also preferably provided the auxiliary walls 8" between the walls 8 and those bars 14 between which the partitions 8' do not extend, the partitions 8" as well as the partitions 8' having their edges secured to the bars 14 between the doors. Said partitions 8' and 8" divide the troughs between the openings 15.

Having thus described the invention, what is claimed as new is:—

1. A stock feeder comprising a casing having inclined sides which are open, inclined upwardly diverging jambs secured to said sides upon the exterior thereof and providing feed openings therebetween, inclined upwardly diverging partitions within the casing having their upper edges secured thereto above the said openings, a division bar upon the bottom of the casing for directing the material toward opposite sides from the lower edges of said partitions, the sides having strips projecting upwardly below said openings and forming feed troughs with said division bar, and doors hinged at their upper ends to the sides of the casing at the upper ends of said openings and adapted to swing downwardly and outwardly by gravity against said jambs above said strips for closing the openings, and limited in their inward movement by said partitions.

2. A stock feeder comprising a casing having inclined sides which are open, inclined upwardly diverging jambs secured to said sides upon the exterior thereof and providing feed openings therebetween, inclined upwardly diverging partitions within the casing having their upper edges secured thereto above said openings, a division bar upon the bottom of the casing for deflecting the material toward opposite sides from the lower edges of said partitions, the sides having strips projecting upwardly below said openings and forming feed troughs with said division bar, doors hinged at their upper ends to the sides of the casing at the upper ends of said openings and adapted to swing downwardly and outwardly by gravity against said jambs above said strips for closing the openings, and limited in their inward movement by said partitions, and a partition extending from one side of the casing to the other and having its side edges secured to the respective jambs for providing a plurality of bins.

3. A stock feeder comprising a bottom, walls extending upwardly and outwardly from the front and back edges of the bottom and adapted to overhang those portions of the ground adjacent the front and back of the feeder, there being a feed opening in each of said walls, a door hingedly connected at its upper end to the top of each of said feed openings, said doors normally bearing outwardly by gravity against the sides of the door openings, the bottoms of said door openings being beveled to constitute water sheds, a hopper within the feeder and between the doors, feed troughs between the hopper and the front and back walls and below the paths of the doors, and means within the hopper for controlling the discharge of feed into the troughs.

In testimony that I claim the foregoing as my own, I have hereto affixed my signature in the presence of two witnesses.

ALLEN R. SIMMONS.

Witnesses:
CHAS. E. POTTER,
GEORGE WARD.

Copies of this patent may be obtained for five cents each, by addressing the "Commissioner of Patents, Washington, D. C."